United States Patent [19]

Gulistan

[11] 4,387,497
[45] Jun. 14, 1983

[54] CAPTIVE SCREW ASSEMBLY METHOD AND PRODUCT

[76] Inventor: Bulent Gulistan, 3944 Bon Homme Rd., Woodland Hills, Calif. 91364

[21] Appl. No.: 204,823

[22] Filed: Nov. 7, 1980

[51] Int. Cl.³ .................. B23P 11/00; B23P 19/02
[52] U.S. Cl. .................................. 29/511; 29/520; 29/525; 411/105
[58] Field of Search ............ 411/347, 105, 153, 337, 411/366; 29/511, 520, 525, 515

[56] References Cited

U.S. PATENT DOCUMENTS

| | | | |
|---|---|---|---|
| 3,218,906 | 11/1965 | Dupree | 29/512 |
| 3,368,602 | 2/1968 | Boyd | 411/105 |
| 3,571,904 | 3/1971 | Gulistan | 29/443 |
| 3,577,850 | 5/1971 | Harris et al. | 29/520 |
| 4,117,261 | 9/1978 | Blevins et al. | 29/511 |
| 4,236,562 | 12/1980 | Molina | 151/69 |

*Primary Examiner*—Ervin M. Combs
*Assistant Examiner*—Steven E. Nichols
*Attorney, Agent, or Firm*—Ralph B. Pastoriza

[57] ABSTRACT

A cylindrical bushing is positioned over the shank of a screw member prior to forming threads on the shank. After the threads are formed, the outside diameter of the threads is greater than the inside diameter of the bushing so that the bushing is held captive on the shank of the screw. A cylindrical sleeve is then inwardly deformed so as to be permanently secured to the bushing. The opposite end of the sleeve facing away from the head of the screw shank extends beyond the bushing and forms a skirt which can be peened over the peripheral inner edge of a panel opening to secure the sleeve to the panel, thereby holding the screw captive to the panel. The end of the bushing next to the underside of the screw head has an increased internal diameter portion for accommodating a spring serving to bias the head and shank away from the bushing so that when the screw is unfastened, it will pop outwardly and release quickly any member to be secured to the panel.

4 Claims, 5 Drawing Figures

U.S. Patent    Jun. 14, 1983    4,387,497
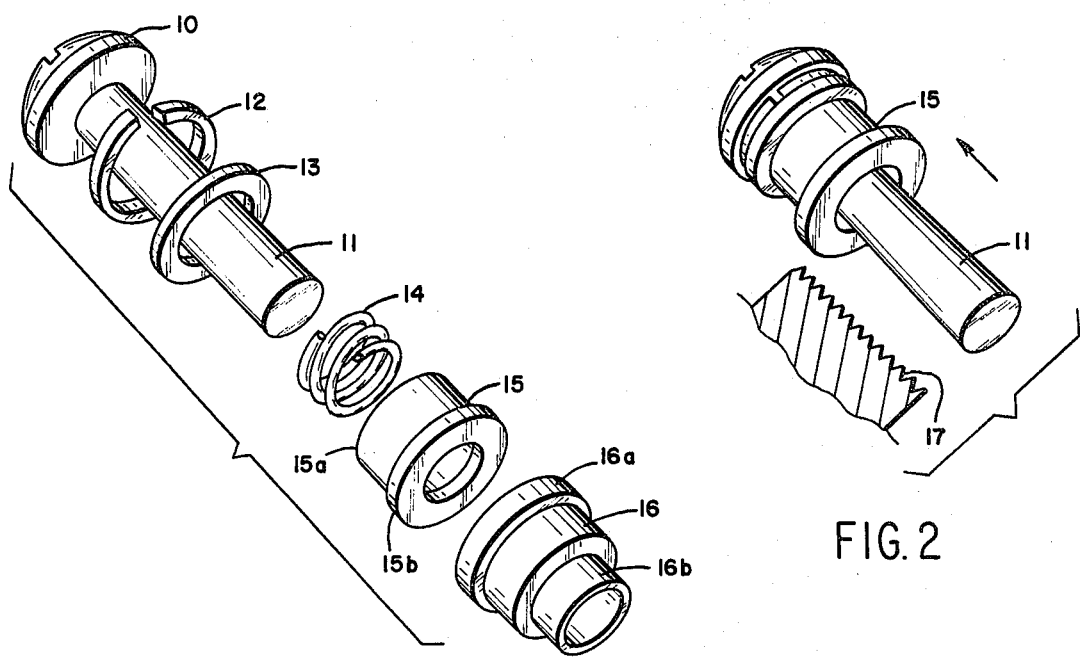
FIG. 1
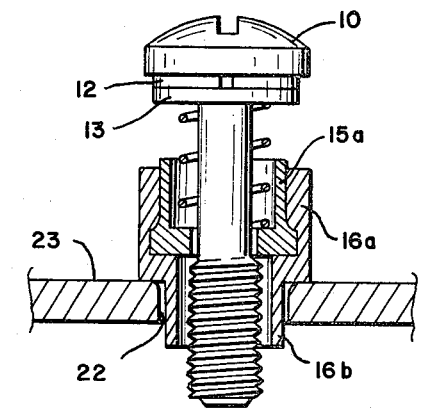
FIG. 2
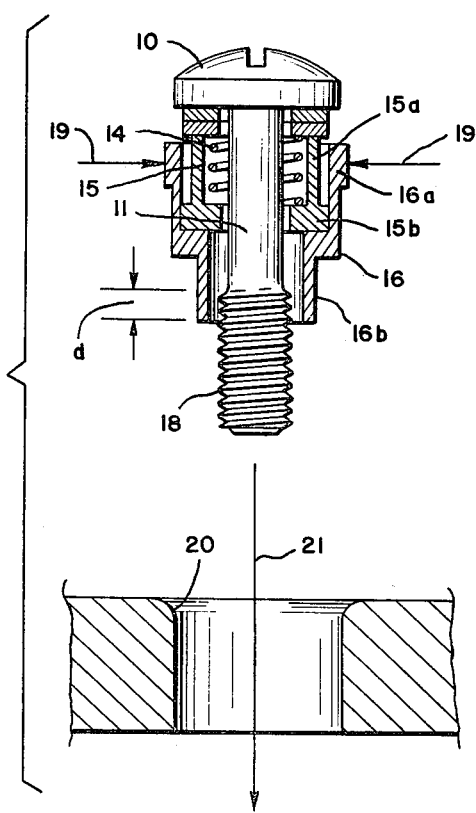
FIG. 3
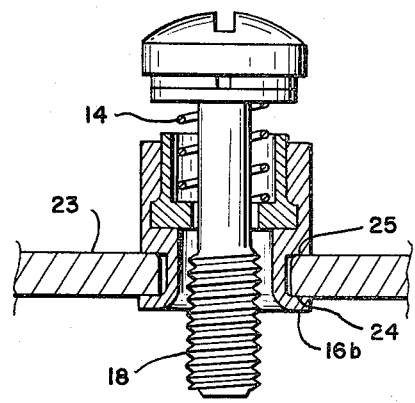
FIG. 4
FIG. 5

CAPTIVE SCREW ASSEMBLY METHOD AND PRODUCT

This invention relates generally to fasteners and more particularly to an improved captive screw assembly method and product.

BACKGROUND OF THE INVENTION

In my U.S. Pat. No. 3,571,904 issued Mar. 23, 1971 and assigned to Deutsch Fastener Corp., there is disclosed a captive screw arrangement including a screw shank and sleeve member. The sleeve member has an internal bore diameter slightly greater than the diameter of the smooth shank portion of the screw so that the sleeve can be received over the shank. After the sleeve is positioned on the shank, the protruding end of the screw is then hand-rolled with threads. These threads will have an outside diameter greater than the nominal diameter of the smooth shank portion of the screw because of the working of the metal. This outside diameter of the screw threads is greater than the internal bore diameter of the sleeve, so that the sleeve is thus held captive on the screw. The sleeve itself can then be secured in a panel opening and the screw axially moved through the sleeve to threadedly engage any appropriate cooperating member to effect a fastening.

Such captive screw arrangements are advantageous simply in avoiding the loss of screws from panels and the inconvenience of having to replace dropped or lost screws.

While my above-described captive screw has been quite successful, the design is such that the screw threads can only be applied to the screw shank after the sleeve has been positioned on the shank. The axial length of the sleeve on the shank limits the axial extent of the threads formed on the shank. As a consequence of the limited thread length, when the screw is threaded into a relatively thin cooperating member to be secured to the panel, the threads may pass entirely through the cooperating member and the smooth shank portion then be in a position within the threaded cooperating member so that the screw simply spins and while it will hold the cooperating member to the panel, there is not secured a tight engagement. Such could be overcome if the threads could be made axially longer but such is not possible without interference with the sleeve.

To overcome the foregoing problem, and also to enable the use of automatic thread rolling equipment, I have invented an improved captive screw assembly and method of making the same described and claimed in my copending United States patent application Ser. No. 92,769 filed Nov. 9, 1979. In this pending application, the threads are rolled on the smooth screw shank prior to positioning of a sleeve over the shank. The sleeve is then positioned over the shank and the end of the sleeve adjacent to the underside of the screw head is peened inwardly by an appropriate sloping undercut on the screw head to decrease the internal diameter of the sleeve at this point to a value less than the external or outside diameter of the screw threads so that the sleeve is thus held captive on the threads.

The foregoing product and method of making the same, however, does not readily admit of the use of a coil spring to bias the screw head and shank away from the sleeve so that there is lacking the convenient feature of a "pop-out" screw immediately indicating release of a cooperating member to be held by the panel.

BRIEF DESCRIPTION OF THE PRESENT INVENTION

With the foregoing considerations in mind, the present invention contemplates yet another type of captive screw assembly method and product wherein not only can the threads on the screw shank be made of sufficient axial lengths to preclude the possibility of the threads passing all the way through a cooperating member and simply resulting in a "spinning" of the screw in attempting a fastening, but additionally permits the use of a coil spring to bias the screw outwardly away from the cooperating member after the same has been unthreaded and released. In addition, all of the advantages of a captive screw assembly are still present.

Briefly, the method of this invention contemplates inserting a cylindrical bushing over the shank of the screw member prior to forming threads on the shank and positioning one end of the bushing next to the underside of the screw head so that the maximum length of the screw shank is exposed from the opposite end of the bushing. This bushing is of an axial length considerably shorter than the normal sleeves utilized heretofore so that threads can now be formed on the screw shank over a given exposed length of the shank, such length being greater than possible if a sleeve were first positioned onto the shank as in my aforementioned United States patent.

The inside diameter of the bushing is less than the outside diameter of the formed screw threads so that the bushing is held captive on the screw shank. After the foregoing steps, the method includes the additional steps of then inwardly deforming an outer sleeve onto the bushing.

This outer sleeve has means spaced axially beyond the end of the bushing from which the screw shank extends for securing the sleeve to a panel opening. With this arrangement, the screw is held captive by way of the bushing in turn secured to the sleeve. Since only the bushing is initially provided about the shank, the threads can be made of sufficient length that threaded engagement with a cooperating member to engage the panel is assured even when the cooperating member is fairly thin and urged upwardly against the panel opening.

In the preferred embodiment of this invention, the bushing is provided at its one end next to the underside of the screw head with an internal increased diameter portion to accommodate a coil spring which will serve to bias the head and shank of the screw away from the bushing so that upon unthreading of the same from a cooperating member, the screw will "pop out" and yet be held captive.

BRIEF DESCRIPTION OF THE DRAWINGS

The foregoing, as well as further features and advantages of this invention, will be understood by now referring to the accompanying drawings in which:

FIG. 1 is an exploded perspective view of the basic components making up my improved captive screw assembly;

FIG. 2 is a perspective view of certain ones of the components of FIG. 1 in assembled relationship in accord with certain steps of the method;

FIG. 3 is an elevational view of the complete assembly of the captive screw just prior to effecting a further step of the method of forming the assembly;

FIG. 4 shows the captive assembly of FIG. 3 after a further step has been carried out and the same is to be positioned in a panel opening; and, FIG. 5 shows a finalized position of the captive screw assembly secured to the panel opening.

DETAILED DESCRIPTION OF THE INVENTION

Referring first to FIG. 1, there is shown a screw having a head 10 and smooth shank portion 11. Preferably a split lock washer 12 and smooth washer 13 are provided to seat against the underside of the head 10. A coil spring 14 is next positioned over the smooth shank 11 of the screw and thereafter a cylindrical bushing 15 is positioned on the shank 11. The last component takes the form of a sleeve 16 but this sleeve is not inserted until after threads have been formed on the shank 11.

The formation of the threads is schematically depicted in FIG. 2 as by an appropriate thread forming die 17, the bushing 15 being shown with one end next to the head so that the maximum length of the screw shank 11 is exposed from the opposite end of the bushing.

Referring to FIG. 3, threads 18 are shown formed on the smooth shank 11. The inside diameter of the bushing at its end portion from which the shank 11 extends is less than the outside diameter of the formed screw threads 18 so that the bushing is now held captive on the screw shank.

In FIG. 3, the sleeve 16 is shown positioned to surround the bushing 15 and this sleeve is arranged to be inwardly deformed onto the bushing 15 as will now be described.

From a careful inspection of the showing of FIG. 3, it will be noted that the bushing 15 is formed at its end facing the underside of the screw head and designated 15a with an external reduced diameter portion and internal increased diameter portion relative to the external and internal diameters of the bushing at its opposite end designated 15b. The coil spring 14 is accommodated within the internal increased diameter portion of the end 15a as shown in FIG. 3.

The outer sleeve 16, in turn, includes at its one end facing the underside of the screw head 10 a thickened wall portion 16a. The other end of the sleeve 16 extending beyond the end of the bushing 15 from which the shank 11 extends has a reduced external diameter portion defining a thin annular skirt 16b. This skirt 16b serves as a means for securing the sleeve to a panel as will be subsequently described.

In FIG. 3, there is designated by their radially inwardly extending arrows 19 a compression or pressing force exerted on the thickened wall portion 16a of the sleeve 16 to force the metal into the external reduced diameter portion of the end 15a of the bushing. In other words, the sleeve is inwardly deformed so as to be permanently secured to the bushing. This securement is accomplished by a die 20 shown below the assembly by passing the entire assembly through the die as indicated by the arrow 21.

Referring to FIG. 4, this drawing of the assembly through the die has resulted in a flush relationship of the portion 16a with the remaining central portion of the sleeve 16.

In the final step of securing the captive screw to a panel, the extreme end of the skirt 16b is passed through a panel opening 22 in a panel 23 as shown in FIG. 4. This skirt 16b is then peened radially outwardly to engage the inner peripheral edge of the opening.

The foregoing operation is illustrated in FIG. 5 wherein it will be clear that the skirt 16b engages the inner peripheral portion 24 of the opening while the resulting annular shoulder defining the beginning portion of the skirt engages at 25 the entrance edge of the panel opening.

From the foregoing, it can now be appreciated that even when the screw head and shank are urged downwardly through the bushing so that the underside of the washers seat on the one end of the bushing, the threads 18 still extend at least partially within the peened over skirt portion so that any thin cooperating member to be threadedly secured to the panel or fastened thereto by the screw will always be in threaded engagement with the threads 18. As mentioned, in prior art structures where a sleeve is initially positioned about the shank, the axial extent of the sleeve to provide the necessary skirt to secure the same to the panel was such that the threads 18 could not be formed over a sufficient axial length to assure that threaded engagement with a cooperating member would always exist.

By the use of the bushing in accord with the method and product of this invention, it is possible to provide the necessary thread length on the screw shank as well as enable the use of a coil spring to provide the desired "pop-out" feature.

It can thus be seen that the present invention provides yet another captive screw assembly method and product having certain advantages over presently available systems.

I claim:

1. A method of providing a captive screw assembly including the sequential steps of:
   (a) inserting a cylindrical bushing over the shank of a screw member prior to forming threads on the shank and positioning one end of the bushing next to the underside of the screw head so that the maximum length of the screw shank is exposed from the opposite end of the bushing;
   (b) forming threads on the screw shank over a given exposed length of the shank, the inside diameter of said bushing being less than the outside diameter of the formed screw threads, so as to be held captive on the screw shank; and
   (c) inwardly deforming an outer sleeve onto said bushing, said outer sleeve having means spaced axially beyond said opposite end of said bushing for securing the bushing to a panel opening whereby the threads can be formed of sufficient length to assure continuous threaded engagement with a member to be fastened to the panel by the captive screw.

2. The method of claim 1, in which said bushing is formed with an external reduced diameter portion and internal increased diameter portion over its end facing the underside of said head relative to the external and internal diameters of the bushing at said opposite end; and including the step of first positioning a coil spring about the screw shank before insertion of the bushing, the coil spring being accommodated within the internal increased diameter portion of the bushing and serving to bias the screw head and shank away from the bushing and surrounding sleeve, said sleeve being inwardly deformed into said external reduced diameter portion of said bushing.

3. The method of claim 1, in which said means for securing said sleeve to the opening in said panel is provided by a reduced external diameter portion on said sleeve end facing away from said bushing to provide a thin skirt which can be peened radially outwardly to engage the inner peripheral edge of the panel opening.

4. The method of claim 1, in which the end portion of said sleeve facing towards the underside of the head of said screw has a thickened outer wall, said inwardly deforming step being effected by drawing the assembly through a die to force the thickened wall into said external reduced diameter portion of said bushing so that the outer wall becomes flush with the remaining portion of said sleeve.

* * * * *